US012573362B2

(12) United States Patent
Hansen

(10) Patent No.: US 12,573,362 B2

(45) Date of Patent: Mar. 10, 2026

(54) ACOUSTIC ENCLOSURE FOR SOUND AMPLIFICATION

(71) Applicant: Carl Hansen, Carlisle, MA (US)

(72) Inventor: Carl Hansen, Carlisle, MA (US)

(73) Assignee: Hansen Electronic Architecture and Design, LLC, Carlisle, MA (US)

(*) Notice: Subject to any disclaimer, the term of this patent is extended or adjusted under 35 U.S.C. 154(b) by 297 days.

(21) Appl. No.: 18/339,573

(22) Filed: Jun. 22, 2023

(65) Prior Publication Data

US 2023/0419935 A1 Dec. 28, 2023

Related U.S. Application Data

(60) Provisional application No. 63/366,889, filed on Jun. 23, 2022.

(51) Int. Cl.

*G10K 11/00* (2006.01)
*H04R 1/28* (2006.01)
*H04R 29/00* (2006.01)

(52) U.S. Cl.

CPC ........... *G10K 11/002* (2013.01); *H04R 1/288* (2013.01); *H04R 29/001* (2013.01); *H04R 2201/003* (2013.01)

(58) Field of Classification Search

CPC ...... H04R 1/28; H04R 1/2803; H04R 1/2869; H04R 1/2873; H04R 1/2876; H04R 1/288; H04R 3/002; H04R 29/00; H04R 29/001; G10K 11/02; G10K 11/002; H04S 2400/15

See application file for complete search history.

(56) References Cited

U.S. PATENT DOCUMENTS

| | | | | | |
|---|---|---|---|---|---|
| 1,675,102 | A * | 6/1928 | Holland | G10K 11/20 | 181/287 |
| 1,966,288 | A * | 7/1934 | Foltz | E04H 1/14 | 52/64 |
| 3,951,228 | A * | 4/1976 | Schnell | G10K 11/16 | 181/200 |
| 4,357,499 | A * | 11/1982 | Bruel | H04R 29/001 | 367/13 |
| 4,366,882 | A * | 1/1983 | Parker | E04B 1/99 | 181/198 |
| 4,514,714 | A | 4/1985 | Kanoi et al. | | |
| 4,805,728 | A * | 2/1989 | Carter | H04R 3/02 | 181/146 |
| 5,009,043 | A | 4/1991 | Kurrasch | | |
| 5,123,874 | A * | 6/1992 | White, III | E04B 1/34321 | 181/290 |
| 5,274,200 | A * | 12/1993 | Das | E04B 1/8218 | 415/119 |
| 6,119,808 | A * | 9/2000 | Steedman | E04B 1/8218 | 181/290 |

(Continued)

*Primary Examiner* — Edgardo San Martin

(74) *Attorney, Agent, or Firm* — Dunlap Bennett & Ludwig PLLC

(57) ABSTRACT

An acoustic attenuation enclosure providing a plurality of panels connectable to define a boundary of the acoustic attenuation enclosure housing an electroacoustic transducer converting an electrical audio signal propagated in an external environment, wherein the acoustic attenuation enclosure substantially maintains a first acoustics regardless of a second acoustics of the external environment.

10 Claims, 6 Drawing Sheets

(56) References Cited

U.S. PATENT DOCUMENTS

| | | | |
|---|---|---|---|
| 6,434,240 B1 | 8/2002 | Kulas | |
| 6,520,282 B1 | 2/2003 | Hadzic et al. | |
| 6,604,603 B1 | 8/2003 | Wirth | |
| 7,490,697 B1 * | 2/2009 | Williamson, Jr. | G10K 11/16 181/204 |
| 7,783,069 B1 * | 8/2010 | Miller | H04R 1/342 381/345 |
| 8,069,946 B1 * | 12/2011 | Cruise, III | H04R 1/28 181/198 |
| 8,139,785 B2 * | 3/2012 | Ferrill | H04R 1/02 381/89 |
| 8,408,356 B2 * | 4/2013 | Yamaguchi | H05K 7/20736 181/216 |
| 8,835,883 B2 | 9/2014 | Muto et al. | |
| 9,284,727 B2 | 3/2016 | McKnight et al. | |
| 9,930,443 B1 | 3/2018 | Mathur | |
| 9,980,023 B1 * | 5/2018 | Fallon | H04R 1/222 |
| 9,992,592 B1 * | 6/2018 | Alam | H04R 29/001 |
| 10,104,761 B1 * | 10/2018 | MacDonald | H04R 1/025 |
| 10,362,386 B2 | 7/2019 | Jaguste | |
| 10,477,302 B2 | 11/2019 | Martincic et al. | |
| 10,979,801 B2 | 4/2021 | Fallon | |
| 11,021,870 B1 | 6/2021 | McKnight et al. | |
| 11,081,096 B2 | 8/2021 | Schnitta | |
| 11,128,941 B1 | 9/2021 | Blemel | |
| 11,172,288 B1 | 11/2021 | Mathur | |
| 11,721,314 B2 * | 8/2023 | Mathur | G10K 11/17857 381/71.8 |
| 2011/0240402 A1 | 10/2011 | Chou et al. | |
| 2014/0341419 A1 * | 11/2014 | Risberg | H04R 1/2815 381/386 |

* cited by examiner

ACOUSTIC ENCLOSURE FOR SOUND AMPLIFICATION

CROSS-REFERENCE TO RELATED APPLICATION

This application claims the benefit of priority of U.S. provisional application No. 63/366,889, filed 23 Jun. 2022, the contents of which are herein incorporated by reference.

BACKGROUND OF THE INVENTION

The present invention relates to acoustic enclosures and, more particularly, to acoustic enclosures for sound amplification and signal processing.

Presently, electric guitar amplification via a loudspeaker and the dynamic response of the amplified sound is heavily dependent on the acoustic environment. Further, any acoustic signal from a guitar amplifier that is measured via acoustic sensors (microphones, etc.) is similarly dependent on the physical environment as well as the sensor configuration. The acoustic conditions encountered during guitar performance are variable and, therefore, difficult to control. Current methods to enforce consistency include ad hoc panels, blankets, guitar amplifier cases, and other types of passive enclosures that produce unintended effects (reflections, resonances, and filtering of desirable frequencies)

As can be seen, there is a need for a device that provides users with a consistent, desirable tone regardless of the surrounding acoustic environment, one that is portable, modular, and convenient for musicians that perform on stage and in the studio.

SUMMARY OF THE INVENTION

A general overview of the various features of the invention will be provided, with a detailed description following. Broadly, an embodiment of the present invention provides a portable and convenient acoustic enclosure capable of maintaining a consistent, desirable tone regardless of an acoustic environment.

The present invention integrates and enhances processes to amplify a musician's sound. A goal of the present invention is to provide musicians, and particularly guitar players, with a convenient, portable device that will allow them to maintain a consistent, desirable tone, regardless of an acoustic environment.

Advantages of the present invention include portability, modularity, and the integration of multiple functions such as acoustic attenuation and tone enhancement using acoustic sensors (microphones, accelerometers, etc.). The present invention may also reduce interconnection noise problems by tying all musical instrument effects to the same, integrated electrical network.

Some embodiments of the present invention may acoustically enhance the properties or qualities of a room or enclosed space and digitally enhance audio experience via signal processing to another sound amplification/recording system. For example, the present invention includes an acoustic enclosure that surrounds an amplifier (or loudspeaker) of a musical instrument. The acoustic enclosure has acoustic panels that define an acoustically enhanced spaced, which provides an attenuated, consistent, and enhanced acoustic tone for musicians in any room.

Advantageously, the panels that surround the enclosure are removably latched, and may contain active electronics and signal processing functionality to reamplify the enhanced sound generated by the acoustic action of the enclosure.

In some embodiments, the present invention enables processing an audio signal that starts with a musical instrument and is then output through a loudspeaker or a similar device into the acoustic enclosure. For example, the present invention may sense the audio signal directly from a loudspeaker system (as opposed to the instrument) and process the sound based on the acoustic properties of the loudspeaker and its interaction with the portable enclosure (and not the instrument).

The system may comprise multiple components. A primary enclosure may be assembled of six acoustic panels by latching them together to form an acoustic attenuation chamber that encloses a loudspeaker/amplifier. The method of securing the panels to form the acoustic enclosure is not particularly limited by the present invention. At least one panel may contain or include components to enable power and audio to interface with the enclosure and heat removal devices (such as a fan, thermoelectric cooler, etc.). Any panel may contain one or more sensors (i.e., a sensor array) comprising microphones, accelerometers, or other vibration transducers.

The panels may further include mechanical transducer mounting or access points, for example, for a user to include or insert a microphone. The mechanical transducer mounting may include an adjunct sound cavity operatively associated with the acoustic attenuation chamber. The transducer mounting or access point may be placed on any panel. In some embodiments, a user-provided microphone is an alternative to an embedded sensor array (e.g., microphone/accelerometer/sensor). A panel with a microphone (whether embedded or user-provided) may be referred to as a panel transducer.

In one aspect of the present invention, an acoustic attenuation enclosure includes a plurality of panels connectable to define a boundary of the acoustic attenuation enclosure housing an electroacoustic transducer converting an electrical audio signal propagated in an external environment, wherein the acoustic attenuation enclosure substantially maintains a first acoustics regardless of a second acoustics of the external environment.

In another aspect of the present invention, the acoustic attenuation enclosure further includes a sensor array along an interior surface of at least one panel of the plurality of panels, wherein the sensor array comprises microelectromechanical system (MEMS) or other miniature transducers; further providing a heat removal device through at least one panel of the plurality of panels; an input/output connection through at least one panel of the plurality of panels, wherein the input/output connection electrically couples the electroacoustic transducer with an instrument in the external environment; an adjunct sound cavity directly connected to an exterior surface of one of the panels of the plurality of panels, wherein the adjunct sound cavity provides a microphone; or a mounting port passing through one of the panels of the plurality of panels, wherein a microphone is mounted within the acoustic attenuation enclosure by way of the mounting port.

In yet another aspect of the present invention, a method of processing an acoustic energy, the method includes providing an electroacoustic transducer within the above-mentioned acoustic attenuation enclosure; sensing the acoustic energy through the sensor array; and processing the acoustic energy to neutralize acoustic reflections within said acoustic attenuation enclosure.

By first and second acoustics, it is understood to be the properties or qualities of a room, building, or enclosed space that determine how sound is transmitted in it.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
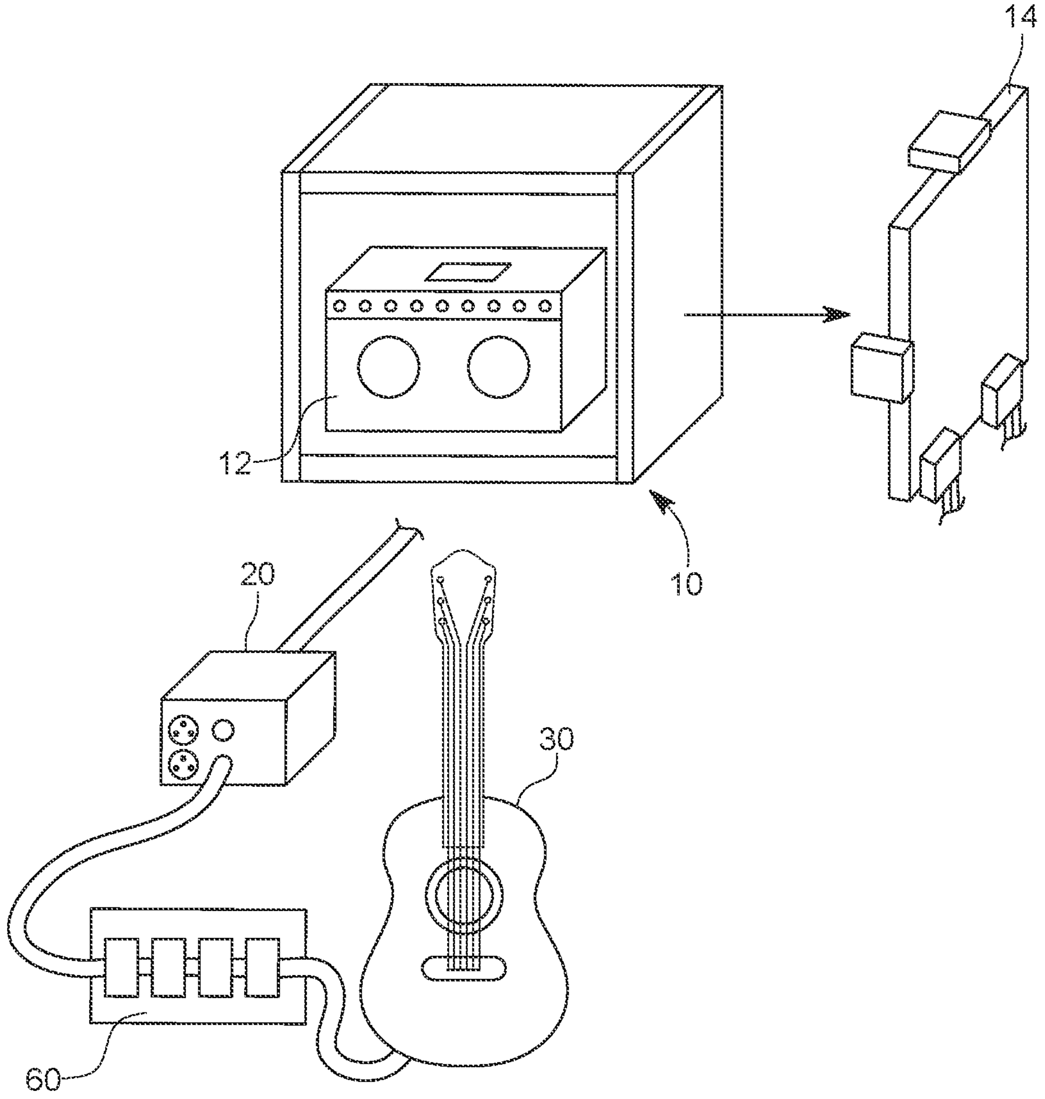
FIG. 1 is a schematic view of a system for an acoustic enclosure according to an embodiment of the present invention.

Referring now to the Figures, FIG. 1 is a schematic view according to an embodiment of the present invention, showing an acoustic enclosure 10 formed of six panels 14. The acoustic enclosure 10 houses a loudspeaker/amplifier 12. The acoustic enclosure 10 is electronically connected to an input/output (IO) hub 20. The hub 20 may be further connected to an audio mixer, a recording interface, a power source, and a musical instrument 30. In FIG. 1, 10 hub 20 is electrically connected to a guitar.

Figure 2:
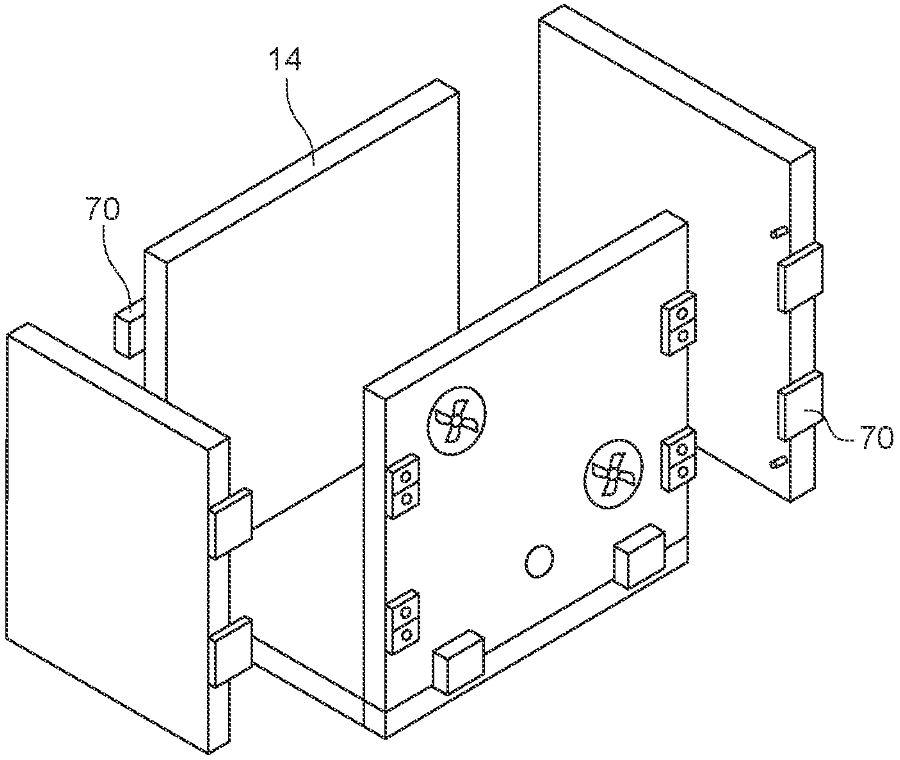
FIG. 2 is an exploded perspective view of an exemplary embodiment of the present invention.

FIG. 2 is an exploded perspective view illustrating a plurality of panels 14 that can be removably latched together to define the acoustic attenuation enclosure 10. Each panel 14 may also include mechanical support plus PCB. Each panel 14 may comprise a wooden frame with a recessed lip on both sides to accept a piece of perforated medium density fiberwood (MDF) or plywood that sandwiches a fiberglass insulation and a floating mechanical support for the embedded sensors and electronics. Each panel 14 may be wrapped in carpet or another sound reducing mechanism. Each panel 14 may provide a plurality of latches 70 for interconnecting to adjacent panels 14.

Figure 3:
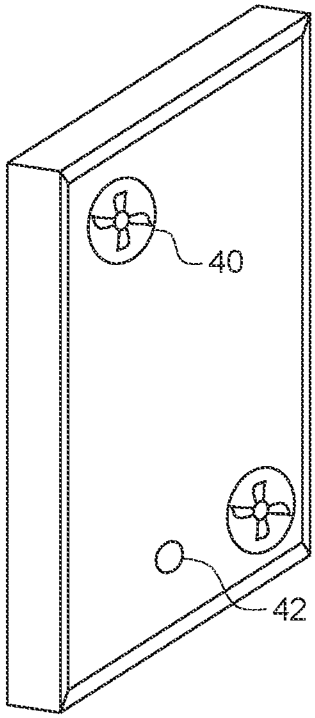
FIG. 3 is a perspective view of an exemplary embodiment of the present invention.
Figure 4:
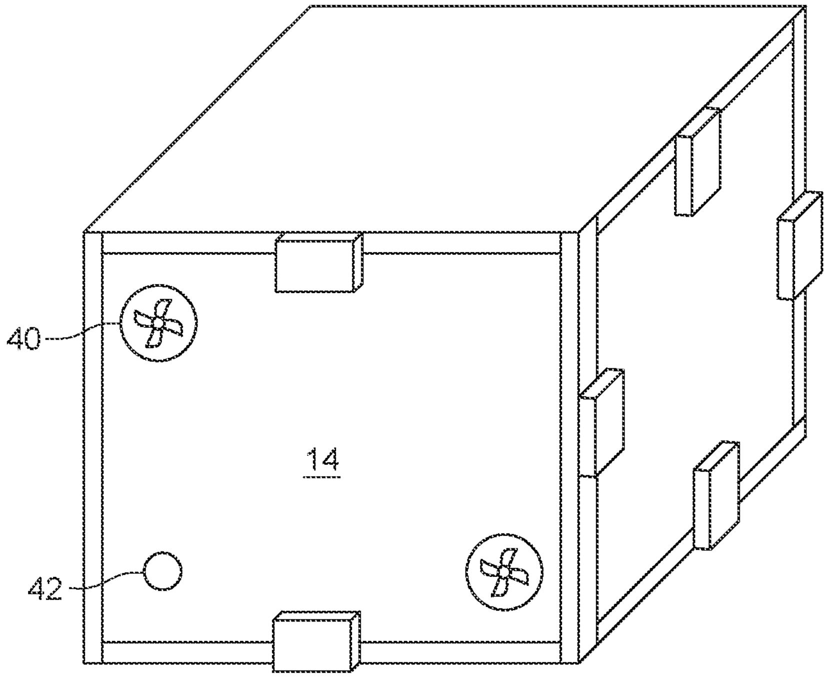
FIG. 4 is a perspective view of an exemplary embodiment of the present invention.
Figure 5:
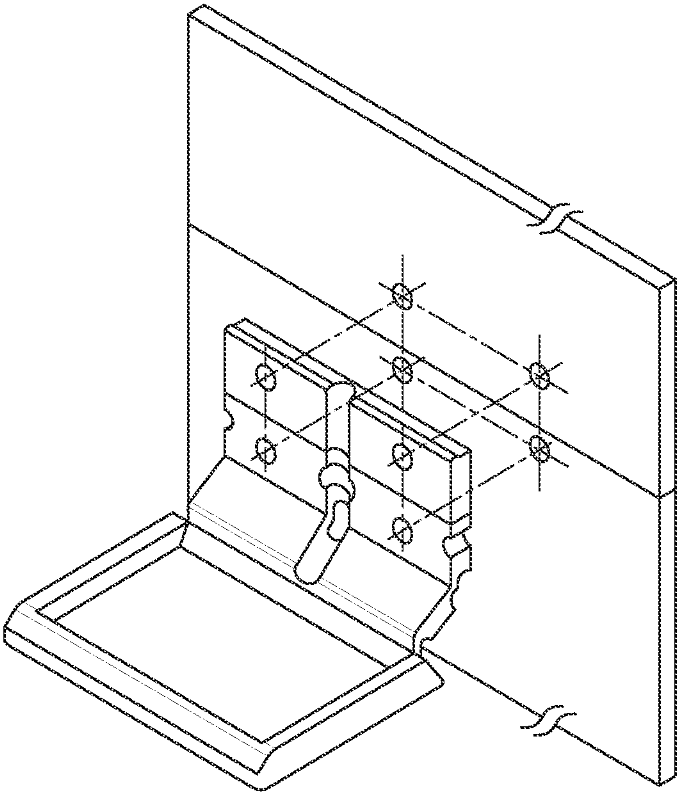
FIG. 5 is a perspective view of an exemplary embodiment of a latching system of the present invention.

FIG. 3 is an exterior view of a panel 14 that includes various components such as one or more heat removal devices 40 and an I/O connection 42. The heat removal device 40 may be a fan, thermoelectric cooler, etc. The I/O connection 42 enables power and audio interface between the interior chamber/acoustic attenuation environment and the external environment. The I/O connection 42 features external interfacing for power and audio. That panel may be attached to an interface box 60 located near a musician (such as near the front of a stage) to provide and accept audio signals from the musician and their instrument(s) 30, plus provide power for any of their local effects.

Figure 8:
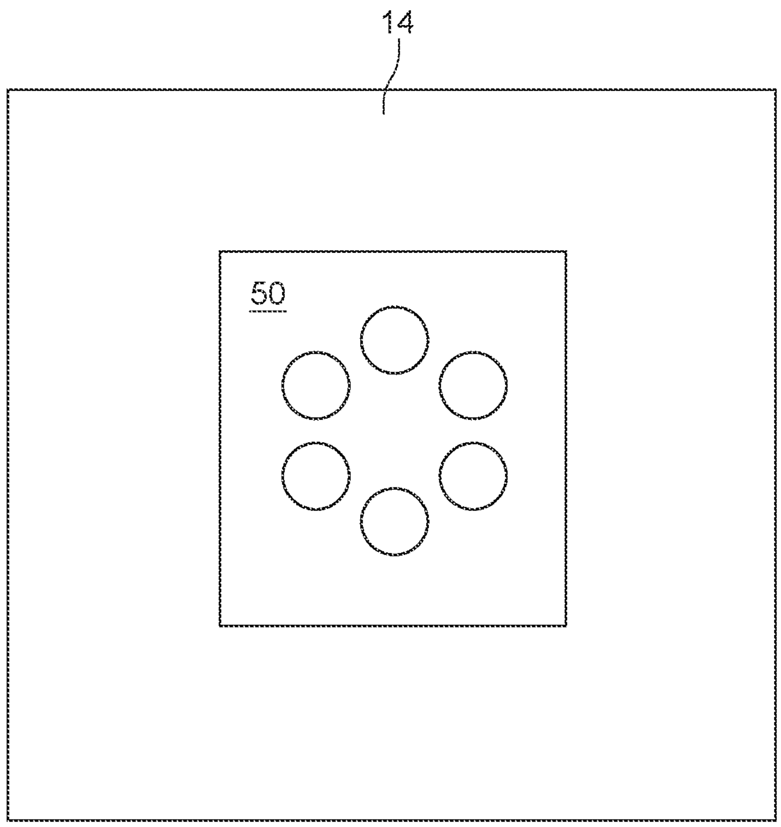
FIG. 8 is an interior elevation view of an exemplary embodiment of the present invention.
Figure 9:
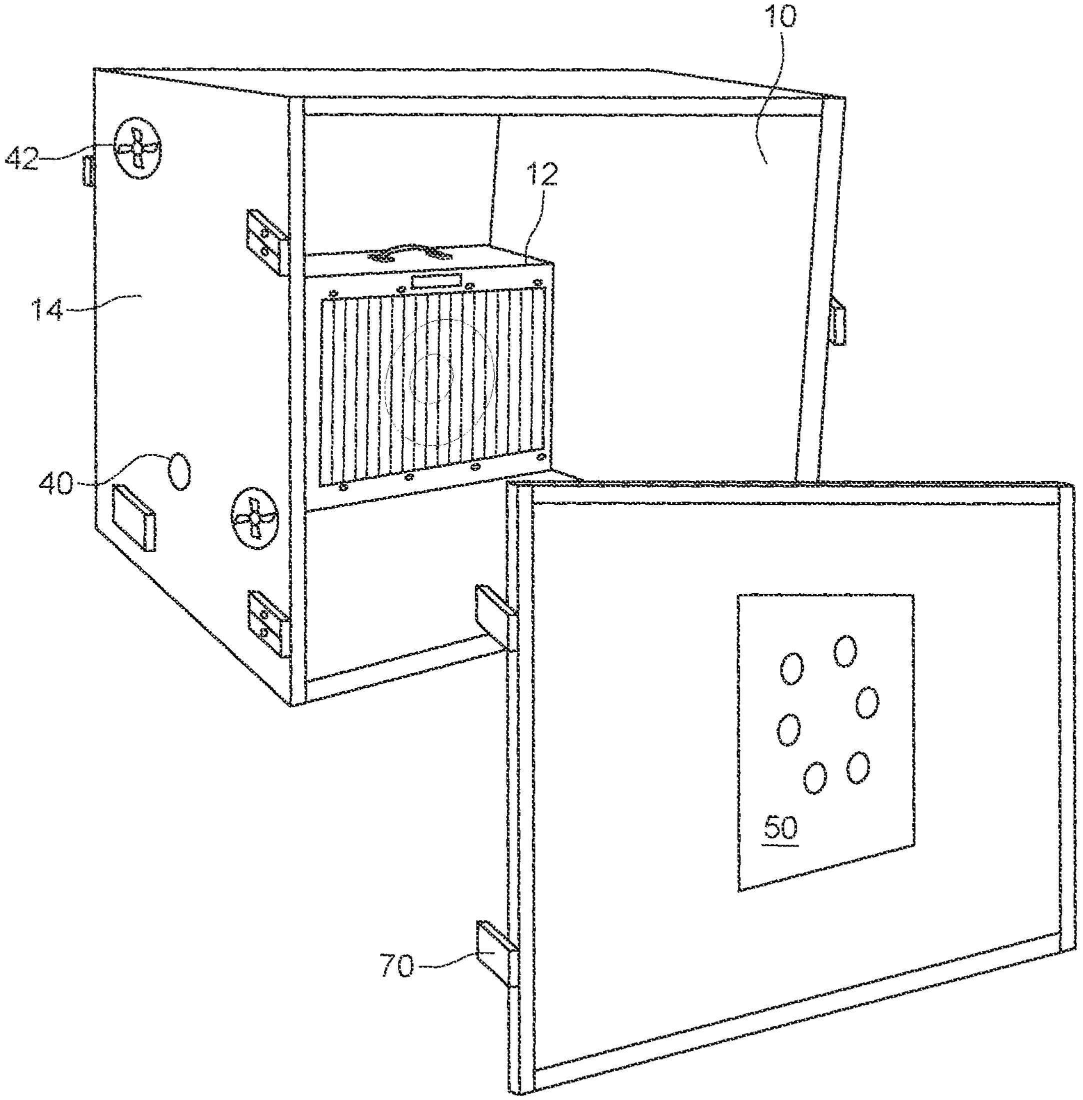
FIG. 9 is a perspective view of an exemplary embodiment of the present invention.

FIG. 8 is an interior view of panel 14, illustrating a sensor array 50. The sensor array 50 may include a plurality of sensors to detect audio: microphones, accelerometers, vibration transducers, and microelectromechanical systems (MEMS) components. The sensor array 50 may have a digital sensor processor (DSP) or analog signal conditioning that receives a signal from microphones and loudspeakers and uses acoustic processing techniques to remove echo and reverberations and transform acoustic impedance to something acoustically neutral.

In some versions of the present invention, a single panel may incorporate all the various components listed. In some embodiments, the components are included on some panels but not others.

Figure 6:
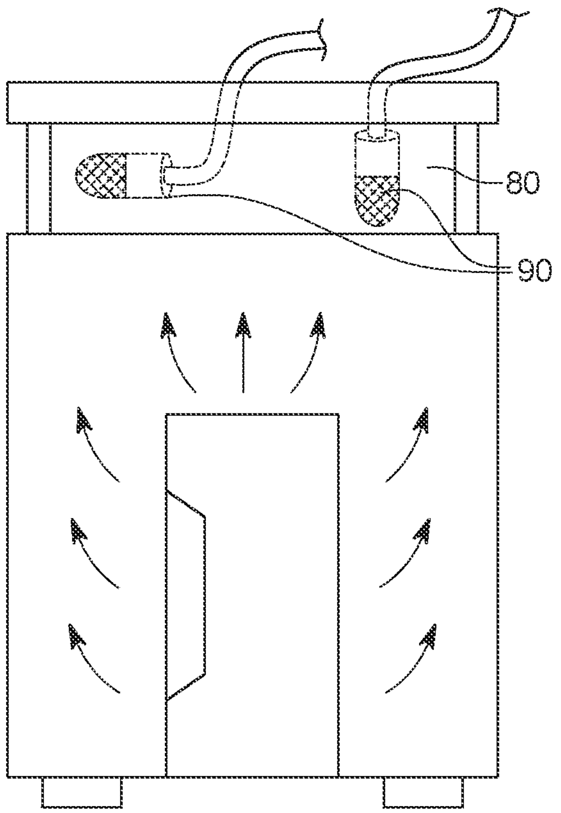
FIG. 6 is an elevation interior view of an exemplary embodiment of the present invention, illustrating a sound cavity mounting structure.

Referring to FIG. 6, further embodiment of the system may support a sound cavity 80 beneath, above, or along the side the acoustic attenuation enclosure 10 for users to selectively configure their own preferred set of studio microphones 90 and signal processing to record or reamplify this attenuated, filtered version of the loudspeaker sound. This sound cavity 80 that operatively associates with the enclosure can house user microphones 90 that do not surround the loudspeaker to capture a similar, yet feature-limited version of the embedded, sensor array 50 approach described herein. Due to the consistent nature and inherent isolation of enclosure assembly 10 and cavity 80, the sound produced may maintain consistency from room to room.

Figure 7:
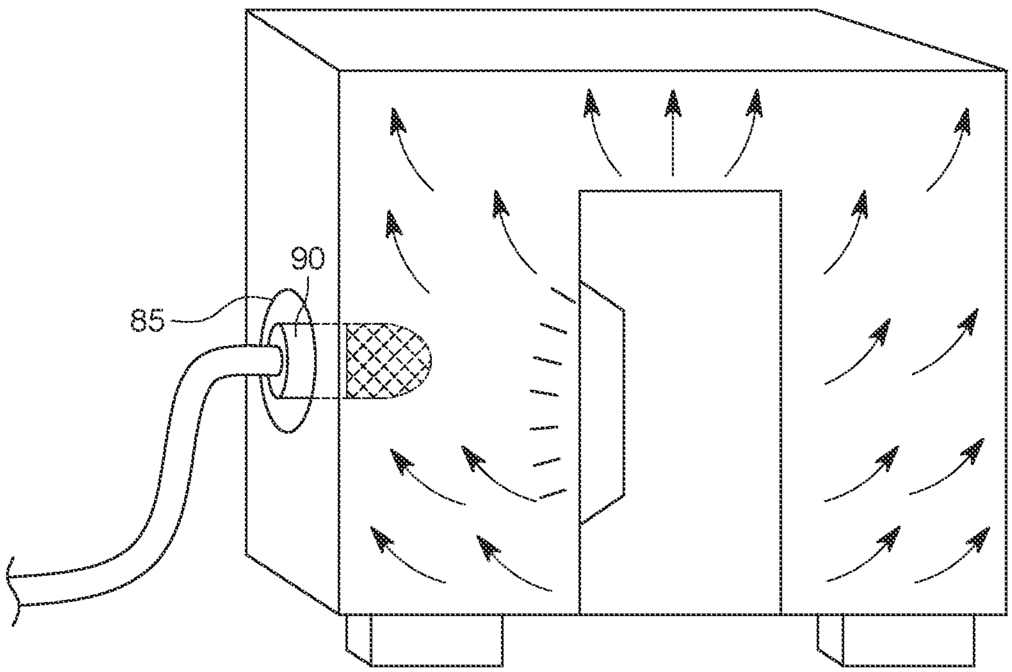
FIG. 7 is a perspective interior view of an exemplary embodiment of the present invention, illustrating an access point mounting structure.

Referring to FIG. 7, alternatively for users that desire their own microphone and signal processing hardware to process the cabinet sound, panels can provide a mounting structure (such as an access hole 85) to house user-provide microphones 90 within the acoustic enclosure 10 in an embedded fashion.

In another embodiment of the present invention, a portion of acoustic energy that is sensed by the array of panel transducers 50 may be automatically processed to eliminate or neutralize acoustic reflections, structural resonances, and other non-ideal audio characteristics though the use of signal processing techniques (beamforming, filters, etc.). Further, this processed, acoustically neutral signal may be enhanced to highlight pleasing characteristics of the loudspeaker or frequency content that is not audible to the user due to the acoustic filtering properties of the enclosure. Additional filtering, transforms, or effects may alter the acoustic signal such that it sounds like the loudspeaker/guitar amplifier is in a different acoustic environment (large hall, damped studio, etc.). The processed signal may then be provided to the user via an electrical interface and can be used to direct record or reamplify in a live performance or practice setting. Beamforming may not be necessary or utilized in some embodiments of the present invention, particularly if only a single transducer (sensor) is available. In some embodiments of the present invention, a single, user-provided studio microphone may be processed by audio filters.

Signal processing capabilities can be configured by the user with a mobile app. Due to the consistent nature of the enclosure assembly, the sound produced may maintain consistency from room to room.

The unique signal processing capabilities (i.e., beamforming) of a plurality of embedded microphones (a sensor array)

surrounding a loudspeaker is not easily achieved with existing studio microphones due to their cost and complexity of configuration, including supporting audio mixers/interfaces and interactions with the room acoustics. The embedded sensor aspect of this system eliminates a number of these issues.

The present invention can be used for any device, instrument, or machine that produces acoustic energy that should be attenuated in the presence of a user. It may also be used for devices that produce acoustic energy that should be monitored for performance. After completing assembly of the acoustic attenuating panels 14 with the integrated latching system 70 and enclosing a loudspeaker system 12, the present invention is configured for use with an alternating current (AC) power source and an audio input signal, typically from a musical instrument. The audio signal may be routed to the enclosed loudspeaker system via the interface box 60 to initiate operation of the system. The audio input signal may drive the loudspeaker 12 to generate acoustic energy within the enclosure. The acoustic energy is absorbed, reflected, transmitted, and sensed by the acoustic panels 14 with embedded sensors A portion of acoustic energy that is transmitted through panels 14 to the external environment is heard by the user and is an attenuated, filtered version of the original sound produced by the loudspeaker 12.

Incorporating all of this in a portable, modular panel-system acoustic attenuating enclosure 10 that can be assembled/dissembled on-site is a unique characteristic of the present invention.

Including the stage interface box 60 for effects power and tying that to the same power network as the loudspeaker may help to reduce noise (i.e., "ground loops") ever-present in audio and musical instrument systems. The overall system may be utilized as a musical technology "hub" for the user.

The materials used to compose the present invention may vary due to cost, weight, and size restraints. The digital sensor processor (DSP) may be utilized, for example, when the materials composing the panels of the invention are not or are less acoustically neutral.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An acoustic attenuation enclosure comprising:

a plurality of panels connectable to define a first boundary of the acoustic attenuation enclosure housing an electroacoustic transducer converting an electrical audio signal propagated in an external environment, wherein the acoustic attenuation enclosure substantially maintains a first acoustics therein regardless of acoustics of the external environment, wherein each panel defines one side of the acoustic attenuation enclosure, and wherein the acoustic attenuation enclosure is modular whereby the plurality of panels is selectively connectable to define a second boundary of the acoustic attenuation enclosure having a second acoustics therein.

2. The acoustic attenuation enclosure of claim 1, further comprising a sensor array embedded in at least one panel of the plurality of panels so that the sensor array does not protrude into the acoustic attenuation enclosure.

3. The acoustic attenuation enclosure of claim 2, wherein the sensor array comprises a microelectromechanical system transducer.

4. The acoustic attenuation enclosure of claim 3, further comprising a heat removal device through at least one panel of the plurality of panels.

5. The acoustic attenuation enclosure of claim 4, further comprising an input/output connection through at least one panel of the plurality of panels, wherein the input/output connection electrically couples the electroacoustic transducer with an instrument in the external environment.

6. The acoustic attenuation enclosure of claim 5, further comprising an adjunct sound cavity directly connected to an exterior surface of one of the panels of the plurality of panels, wherein the adjunct sound cavity provides a microphone.

7. The acoustic attenuation enclosure of claim 5, further comprising a mounting port passing through one of the panels of the plurality of panels, wherein a microphone is mounted within the acoustic attenuation enclosure by way of the mounting port.

8. A method of processing an acoustic energy, the method comprising:

providing an electroacoustic transducer within the acoustic attenuation enclosure of claim 3;

sensing the acoustic energy through the sensor array; and processing the acoustic energy to neutralize non-ideal acoustic characteristics within said acoustic attenuation enclosure.

9. The acoustic attenuation enclosure of claim 1, further comprising, for each panel, a latch mechanism for removably attaching to an adjacent panel of the plurality of panels so that the first boundary is reconfigurable into the second boundary.

10. The acoustic attenuation enclosure of claim 1, further comprising an amplifier housed in the acoustic attenuation enclosure.

* * * * *